United States Patent [19]

Ealey

[11] Patent Number: 4,861,149

[45] Date of Patent: Aug. 29, 1989

[54] MAGNETODISTORTIVE ACTUATOR ARRANGEMENT

[75] Inventor: Mark A. Ealey, Juno, Fla.

[73] Assignee: United Technologies Corporation, Hartford, Conn.

[21] Appl. No.: 142,621

[22] Filed: Jan. 7, 1988

[51] Int. Cl.$^4$ ............................ G02B 7/18; G02B 5/08
[52] U.S. Cl. .................................... 350/611; 350/360; 350/487; 350/610
[58] Field of Search ............... 350/609, 610, 611, 360, 350/361, 486, 487

[56] References Cited

U.S. PATENT DOCUMENTS

| | | | |
|---|---|---|---|
| 1,525,548 | 2/1925 | Jenkins | 350/360 |
| 2,036,554 | 4/1936 | Thomas | 350/360 |
| 4,202,605 | 5/1980 | Heinz | 350/613 |
| 4,655,560 | 4/1987 | Glomb, Jr. | 350/611 |

*Primary Examiner*—Bruce Y. Arnold
*Assistant Examiner*—Martin Lerner
*Attorney, Agent, or Firm*—Peter R. Ruzek

[57] ABSTRACT

A magnetodistortive acutator arrangement for a flexible mirror that is mounted on a support includes an array of magnetodistortive actuators. Each of these actuators includes an elongated core of a highly magnetically permeable material stationarily mounted on the support, centered on a longitudinal axis and having two axially spaced end portions, a solenoid coil surrounding one of the end portions of the core and operative when energized for generating an electromagnetic field which permeates the core and has a high intensity region extending beyond the other of the end portions of the core, an active member of a magnetodistortive material connected to the core and extending axially beyond the other end portion thereof at least partially through the high-intensity region of the electromagnetic field for the latter to cause a change at least the axial dimension of the active member, and a transmitting member which applies this change to the flexible mirror. The coils of adjacent actuators are axially staggered relative to one another so as not to overlap each other.

20 Claims, 2 Drawing Sheets

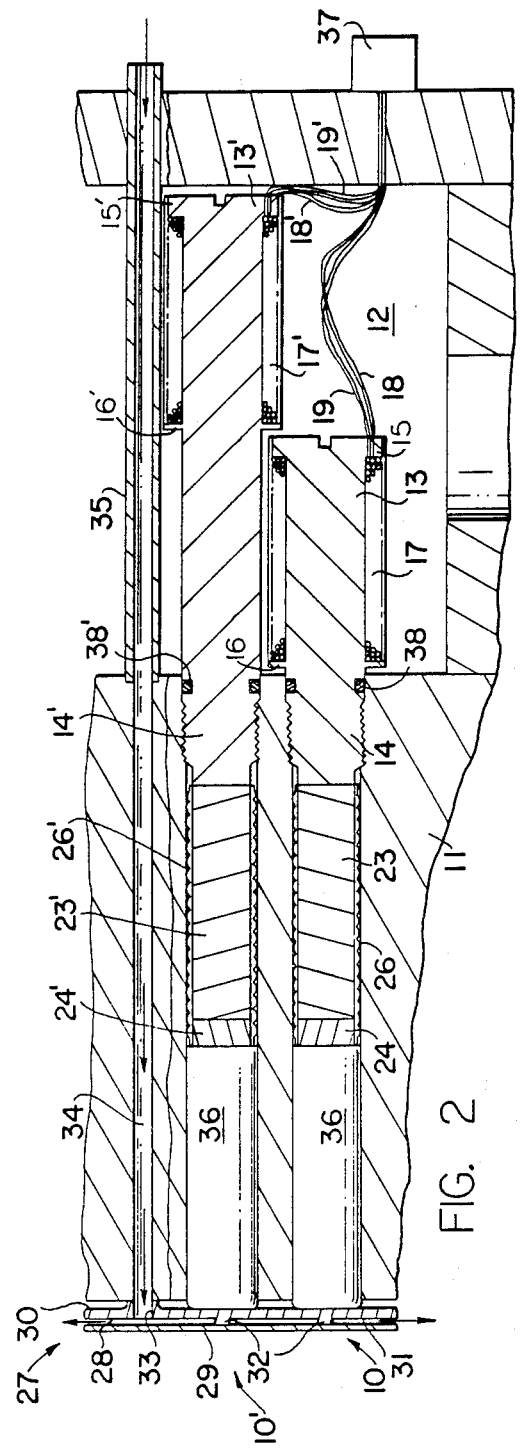

MAGNETODISTORTIVE ACTUATOR ARRANGEMENT

TECHNICAL FIELD

The present invention relates to mirror assemblies in general, and more particularly to an actuator arrangement for use in conjunction with a flexible mirror to change the shape of the mirror.

BACKGROUND ART

There are already known various constructions of actuators, among them such that are suited for use in an array of such actuators for acting on a flexible mirror to change its shape or contour. Experience with the conventional constructions of such actuators has shown, however, that they leave much to be desired for certain applications.

So, for instance, in the field of high-power lasers having large beam diameters, it is common for the quality of the optical beam emerging from the laser gain medium to be inadequate for the purposes on hand, especially since the wave front is not ideal, that is, phase shifts exist between different regions of the cross section of the laser beam. To deal with this situation, it has already been proposed to aim the emerging laser beam against a reflecting surface of a thin flexible mirror faceplate for the laser beam to be reflected by the reflective surface, and to adjust the contour or shape of the thin flexible faceplate usually by means of a plurality of actuators which extend forward and backward and thus change the shape and contour of the flexible plate and thus the contour of the reflective surface of the mirror. The deformable mirror can be used to alter the wave front of the laser beam to allow the laser beam to be propagated more easily through the medium into which it is ultimately injected for propagation, such as through the atmosphere.

In order to be able to correct for optical phase distortions to a high energy laser (HEL) beam as it is propagated through the atmosphere, it has been established that there is a pronounced need for the use of deformable mirrors acted upon and deformed by closely packed actuators, which may have to be spaced at less than 1 centimeter apart. With the advent of more powerful HELs, the beam size, of necessity, increases, resulting in the need for using very large numbers of closely packed actuators.

The closely packed actuator array causes difficulties in the employment of replaceable actuator design features. This is so because the required small spacing of the actuators does not offer reasonable sizing of the necessary mechanical features as executed in state-of-the-art designs. Moreover, heretofore known replaceable actuator designs are known to possess deficiencies with respect to current and future needs, particularly for short wavelength devices.

With the shift to shorter wavelengths (visible and even the ultraviolet) in current and future beam control system designs, actuator performance has become of paramount importance in the development of large aperture, high actuator density (often more than 1000 actuators) deformable mirror assemblies. Replaceable actuators which provide high precision linear response with high bandwidth and close packing density capability are primary components in adaptive optical systems.

Magnetostrictive actuator designs developed over the course of the past few years already addressed and dealt with many of the issues associated with this new generation of deformable mirror architecture. However, several engineering issues have not been satisfactorily resolved by such actuator constructions. So, for instance, thermal expansion associated with iron-based materials necessitates thermal growth control. Thus, additional stroke to compensate for residual thermal growth, increased control system complexity to ensure precision response, and liquid cooling of the actuators and other parts of the mirror assembly to remove the solenoidal and other heating, were some of the approaches taken in the past to address the thermal expansion problem. Yet, such design and fabrication complexities greatly limit the scaling potential and long-term reliability of existing magnetostrictive actuator constructions and systems.

With the increased power densities associated with the new generation laser devices, such as the excimer and free electron lasers, highly reflective coatings which minimize the absorbed power are essential to mirror performance and survivability. Multi-layer dielectric coatings that offer such performance are usually deposited at about 170° C. for extended soak periods. This calls for actuator constructions that are able to withstand such demanding conditions with minimal effect on the heat exchanger and on the substrate/actuator attachment interfaces.

The actuator spacing has been limited in the currently known and used magnetostrictive actuator systems by the necessity for as large a solenoidal copper volume as possible to provide high applied magnetic field and to minimize $I^2R$ losses. This has caused problems in increasing the actuator packing density, that is in reducing the spacings between the adjacent actuators of the actuator array.

As mentioned previously, active cooling to control thermal growth greatly increases the complexity of the actuator array design. Requirements for precision machining, the use of corrosion inhibitors, and the use of specialized adhesives have also resulted in an increase in the per channel actuator costs. The additional requirement for electronic feedback compensation to control or deal with residual thermal growth also increases the electronic driver costs. Thus, it may be seen that the heretofore proposed actuator designs and systems have many drawbacks that limit their use in deformable mirror assemblies and/or increase the cost of their use in such assemblies.

Accordingly, it is a general object of the present invention to avoid the disadvantages of the prior art.

More particularly, it is an object of the present invention to provide an actuator arrangement for use in deformable mirror assemblies, which does not possess the disadvantages of the known actuator arrangements of this kind.

Still another object of the present invention is so to develop the actuator assembly of the type here under consideration as to be compatible with very close packing of the actuators and relatively large surface deformations between adjacent actuators.

It is yet another object of the present invention to devise a mirror arrangement of the above type which renders it possible to deal in a particularly simple way with thermal expansion effects on the performance of the actuator arrangement and of the mirror assembly which employs such actuators.

An additional object of the present invention is to design the above mirror arrangement in such a manner as to be scalable to very large mirror sizes without performance loss or geometry changes.

A concomitant object of the present invention is construct the mirror arrangement of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in a magnetodistortive actuator arrangement which includes an elongated core of a highly magnetically permeable material, centered on a longitudinal axis and having two axially spaced end portions; a solenoid coil surrounding one of the end portions of the core and operative when energized for generating an electromagnetic field which permeates the core and has a high intensity region extending beyond the other of the end portions of the core; and an active member of a magnetodistortive material connected to the core and extending axially beyond the other end portion thereof at least partially through the high-intensity region of the electromagnetic field for the latter to change at least the axial dimension of the active member.

A particular advantage of the construction of the actuator arrangement of the present invention as described so far is that the electromagnetic field that is to be applied to the active member to change its longitudinal dimension is not applied to the active member directly; rather, is it first applied to the core and only then is it applied, through the intermediary of the core, to the active member. This renders it possible to locate the solenoid coil which generates the electromagnetic field remotely from the active member proper and thus to facilitate the removal of the heat generated in the solenoid coil, with attendant reduction in the thermal loading of the region of the active member.

In accordance with another advantageous aspect of the present invention, there is provided a magnetodistortive actuator arrangement for a flexible mirror that is mounted on a support, including an array of magnetodistortive actuators. Each of the actuators includes an elongated core of a highly magnetically permeable material stationarily mounted on the support, centered on a longitudinal axis and having two axially spaced end portions, a solenoid coil surrounding one of the end portions of the core and operative when energized for generating an electromagnetic field which permeates the core and has a high intensity region extending beyond the other of the end portions of the core, an active member of a magnetodistortive material connected to the core and extending axially beyond the other end portion thereof at least partially through the high-intensity region of the electromagnetic field for the latter to cause a change at least the axial dimension of the active member, and means for applying the change to the flexible mirror. In this context, it is particularly advantageous when the solenoids of the actuators that directly adjoin each other in the actuator array are staggered relative to one another to such an extent that they do not overlap each other.

This particular construction of the actuator arrangement has the advantage, in addition to those enumerated before, that the solenoid coils do not interfere with one another. This means that the adjacent actuators can be situated at a distance from each other that is much smaller than if the solenoid coils were located next to one another, thus resulting in the desired or required close packing of the actuators. Moreover, the solenoid coils will be much more readily accessed by the cooling fluid when the solenoid coils are staggered in the above-mentioned manner, resulting in a significantly improved heat transfer from the solenoid coils to the cooling fluid and thus in a considerably more efficient cooling action and reduction of the amount of heat that can be conducted to the region of the active member through the core, as compared to the situation where the solenoid coils would be situated next to one another.

Another advantage of this approach is that any jitter induced in the actuators by the flow of the cooling fluid past the solenoid coils and other parts of the actuators that are in contact with the cooling fluid, which may already be reduced by the increase in the size of the passages through which the cooling fluid flows due to the staggering of the solenoid coils, is basically confined to the solenoid coil region of the actuator and thus is not permitted to propagate to the active member and ultimately to the mirror.

BRIEF DESCRIPTION OF THE DRAWING

The present invention will be described in more detail below with reference to the accompanying drawing in which:

FIG. 2 is an axial sectional view of a portion of a mirror assembly equipped with two actuator arrangements incorporating the features of the arrangement of FIG. 1.

BEST MODE FOR CARRYING OUT THE INVENTION

Figure 1:
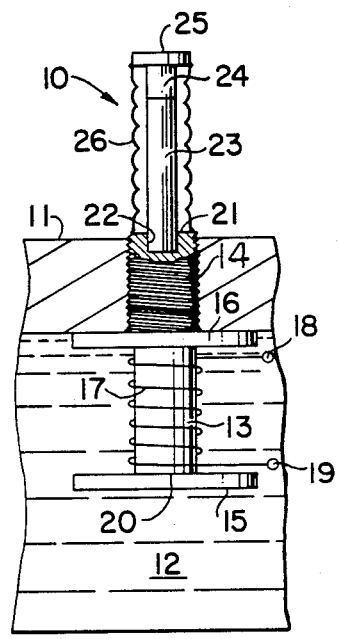
FIG. 1 is a somewhat simplified axial sectional view of an actuator arrangement embodying the present invention.

Referring now to the drawing in detail, and first to FIG. 1 thereof, it may be seen that the reference numeral 10 has been used therein to identify an actuator arrangement constructed in accordance with the present invention, in its entirety The actuator arrangement 10 is mounted on a substrate or support 11 which is preferably constructed as a housing or plenum that bounds a cooling chamber 12 through which a cooling fluid, especially a cooling liquid such as water or liquid ammonia, is being circulated.

The actuator arrangement 10 includes a core 13 which is connected to a threaded plug 14 that is threaded into an internally threaded bore of the support 11. Preferably, however, the threaded plug 14 is integral or of one piece with the core 13 and, therefore, the core 13 and the plug 14 will hereafter be collectively referred to as the core 13, unless it is necessary to refer to them separately.

The interface between the core 13, on the one hand, and the support 11, on the other hand, is sealed in any known manner which is not indicated in the drawing to prevent escape of the cooling fluid from the cooling chamber 12 through this interface. The core 13 is shown to be provided with two end flanges 15 and 16. A solenoid coil or winding 17 is arranged around the core 13 between these end flanges 15 and 16 which act as stops for this coil 17. However, these end flanges 15 and 16 may be omitted if the positional stability of the solenoid coil 17 can be assured in some other way.

The solenoid coil 17 has two terminals or leads 18 and 19 which can be supplied with desired amounts of electric power from a source of electric energy to energize the solenoid coil to the desired level. The energization of the solenoid coil 17 then results in generation of an electromagnetic field which not only permeates the core 13 but also extends beyond respective end portions 20 and 21 of the core 13 and has regions of relatively high intensity at and beyond such end portions 20 and 21.

The end portion 21 of the core 13 is provided with a recess 22 which accommodates a portion of an elongated active member 23 that constitutes an axial extension of the core 13 and is situated at least partially in the aforementioned high-intensity region of the electromagnetic field induced in the core 13 by the action of the solenoid coil 17. The active member 23 is of a magnetodistortive material, that is of a material which changes at least its longitudinal dimension when exposed to a magnetic field.

A permanent magnet 24 is disposed at and in alignment with an end portion of the active member 23 that is remote from the end portion 21 of the core 13. The permanent magnet 24 serves to apply to the active member 23 a permanent magnetic bias which brings the material of the active member 13 into a region of its characteristic response curve in which the response of this material to the total magnetic field applied thereto by the permanent magnet 24 and as a result of the energization of the solenoid coil 17 in terms of elongation or contraction of the active member 23 is substantially linear.

The permanent magnet 24 is adjoined in the same axial direction of the actuator arrangement 10 by an end plate 25 which is in abutment with the permanent magnet 24 and applies an axial mechanical bias through the permanent magnet 24 to the active member 23 in the sense of causing reduction in the axial dimension of the active member 23. This permanent mechanical bias is the result of the action on the end plate or disk 25 of a bellows spring 26 whose one end is connected to the end portion 21 of the core 13 and whose other end is connected to the end plate 25. This mechanical stressing of the active member 23 results in a situation where the active member 23 will be able to respond not only to an increase, but also to a decrease, in the magnetic field originally applied thereto by the permanent magnet 24 as a result of the superimposition of the electromagnetic field induced by the solenoid coil 17 with the permanent magnetic field, without dissociation between the end plate 25 and the permanent magnet 24, or the permanent magnet 24 and the active member 23, or the active member 23 and the core 13. In other words, because of this mechanical bias, the end plate 25 will move in either one of the axial directions of the actuator arrangement 10 to an extent and at a rate determined by the extension or contraction of the active member 23 and thus ultimately by the strength and orientation of the electromagnetic field applied to the active member 23 by the solenoid coil 17.

Turning now to FIG. 2 of the drawing, it may be seen therein that the actuator arrangement 10 and an additional actuator arrangement 10', which has generally the same construction as the actuator arrangement 10 so that the same reference numerals as before but supplemented by a prime have been used to identify corresponding components thereof, are mounted on the support 11 adjacent to one another and are used for deforming a deformable mirror arrangement 27. The illustrated actuator arrangements 10 and 10' are representative of a plurality of such actuator arrangements 10 and 10' which are so arranged in an array that the actuator arrangements 10 alternate with the actuator arrangements 10' and which collectively cause the mirror arrangement 27 to assume the desired spatial configuration.

The mirror arrangement 27 illustrated in FIG. 2 of the drawing includes a flexible faceplate 28 having a reflective surface 29 and a flexible and preferably resilient backing plate 30 which delimit a gap or cooling chamber 31 between themselves The backing plate 31 is shown to be provided with a plurality of actuator posts 32 which are substantially coaxially aligned with the actuator arrangements 10 and 10' and which transmit the motion of the surrounding regions of the backing plate 30 under the influence of the actuator arrangements 10 or 10' to the corresponding regions of the faceplate 28. Preferably, the posts 32 are connected to the faceplate 28, for example by brazing. A cooling fluid, such as water or liquid ammonia, is supplied into the cooling chamber or gap 31 through an opening 33 provided in the backing plate 30, through a duct 34 formed in the substrate or support 11, and through an insulated conduit or pipe 35 that passes through the cooling chamber 12 and through the support 11 between the exterior and the interior of the latter. After entering the gap 31, the cooling fluid flows along the faceplate 28 and the backing plate 30 in the directions indicated by arrows to effectively remove thermal energy especially from the faceplate 28 and the posts 32. It may be seen that the flow of the cooling fluid for the mirror arrangement 27 is separate from and thermally insulated with respect to that of the cooling fluid for the solenoid coils 17 and 17'.

In the construction of the actuator arrangement 10 illustrated in FIG. 2 of the drawing, the end plate 25 mentioned previously has been omitted, and a pusher 36 has been used instead. The pusher 36 is interposed between the permanent magnet 24 and the backing plate 30 and transmits the motion of the permanent magnet 24 to the respective region of the backing plate 30.

FIG. 2 of the drawing also shows that the core 13' of the actuator arrangement 10' extends rearwardly beyond the core 13 of the actuator arrangement 10 to such an extent that the solenoid coil 17' of the actuator arrangement 10' is situated in its entirety rearwardly of the solenoid coil 17 of the actuator arrangement 10, that is at a location where it does not overlap the solenoid coil 17. This renders it possible to pack the actuator arrangements 10 and 10' much more closely to one another than if both of the solenoid coils 17 and 17' were situated at the same region, that is next to one another and in an overlapping or coextensive relationship with respect to each other. Yet, inasmuch as the electromagnetic fields generated by the solenoid coils 17 and 17' are confined by the respective cores 13 and 13', the additional spacing of the solenoid coil 17' from the active member 24' as compared to that present between the solenoid coil 17 and the active member 24 has only a negligible, if any, influence on the extent of distortion of the active member 24' in response to the energization of the solenoid coil 17' and, in any event, can easily be compensated for or taken into account in selecting the amount of electric power to be supplied to the solenoid coil 17' relative to that which would have to be supplied to the solenoid coil 17 to achieve the same amount of distortion of the active member 24. A control or driving arrangement 37 of a known construction is used to supply the requisite amounts of electric power through the respective leads or terminals 18 and 19 or 18' and 19' to the respective solenoid coils 17 or 17'.

The permanent magnet 24 is preferably made of a samarium-cobalt material, while the active member 23 is advantageously made of a magnetostrictive material, such as of a material which is commercially available under the name Terfenol and which is an alloy of terbium, dysprosium and iron that may have a composition designated as $Tb_{0.27}Dy_{0.73}Fe_{1.95}$. The core 13 is made from a high-permeability (relative permeability $u_r > 1000$), soft magnetic transformer steel material. The end plate 25 and particularly the pusher 36 is made of a low thermal expansion coefficient material, such as ULE Glass TM (trademark of Corning Glass Inc.) that provides the capability to match the deformable mirror substrate 11 in terms of thermal expansion coefficient. As a result of the use of this material for the pusher 36, there is obtained minimal differential expansion between the mirror support 11 and the actuator arrangement 10, and this facilitates multi-layer dielectric coating capabilities for the mirror faceplate 28. The glass material of the pusher 36 also has the function of thermally insulating the mirror arrangement 27 from the active member region.

As mentioned before, the permanent magnet 24 is used to bias the magnetostrictive active member 23 into the high-gain, linear-operation region of the strain/field curve. This also facilitates linear push-pull (bipolar) operation with a significant reduction in applied magnetic field requirements. The magnetostrictive active member 23 produces a mechanical displacement or strain as a function of applied magnetic field or energy. It is to be noted in this connection that the active member material is a single solid crystalline material with an extremely low relative permeability ($u_r = 5$).

Only a very small magnetic field (just slightly over 1 oersted) is needed to overcome the coercive force of the soft magnetic material of the core 13. In addition, only a very small applied magnetic field is required to drive the soft magnetic material of the core 13 from zero induction into its saturated region. Also, the saturation induction of the magnetostrictive material of the active member 23 is well within the realm of complete saturation by the magnetic bias applied by the permanent magnet 24. The hard permanent magnet material of the magnet 24, such as samarium-cobalt, is used to apply the flux bias into the high-gain region. However, it is to be noted that neodymium-iron-boron permanent magnet materials, such as that commercially available under the name Cruma (®) 35, show properties that are even better than those of the samarium-cobalt material, so that such materials may be advantageously used instead for the permanent magnet 24.

It will be appreciated that the flux bias modulator that is constituted by the core 13 and the solenoid coil 17 and that essentially constitutes an electromagnet operates as a variable permanent magnet that changes the permanent magnetic flux bias and the corresponding mechanical displacement of the magnetostrictive active member 23 as a function of the applied solenoidal current Simply, the flux generated by the solenoid 17 is transported via the high permeability steel of the core 13 to the active member 23, thus eliminating the otherwise existing necessity of arranging a drive coil around the active member 23 to cause magnetostrictive displacements of the active member 23.

Inasmuch as the relative permeability of the material of the active member 23 is very low, such material would constitute a very poor transformer or solenoid core material. Thus, if the solenoid 17 were arranged around the active member 23, a high number of magnet wire turns and a relatively high electric current would be required to generate sufficient magnetic fields to produce the desired displacements (stroke) required for deformable mirror operations. As a consequence, significant $I^2R$ losses would be encountered, and this would greatly complicate the thermal expansion problem.

On the other hand, a very high permeability soft magnetic steel material makes an ideal solenoid core material. Thus, by making the solenoid core 13 of such a material results in a situation where a much lower number of amp-turns is required to generate a given applied field. Therefore, even though the solenoid 17 is removed from the active member region, resulting in a somewhat reduced magneto-mechanical coupling, sufficient amounts of magnetic flux are transported through the soft magnetic steel material of the core 13 to the active member 23 to produce large strains in the latter. Experience has shown that displacements of up to and possibly more than 10 microns are achievable.

Inasmuch as the solenoid coils 17 and 17' are actively cooled by the cooling fluid flowing through the cooling chamber 12, heat transfer from the flux modulator 13 and 17 to the active member 23 is kept to a minimum, resulting in a good thermal isolation of the active member 23 from the ohmic heating associated with the solenoid 17. Moreover, the end portion 20 of the core 13 is not fixed and hence is free to thermally expand when heated by the $I^2R$ losses Thus, it may be seen that the actuator arrangement 10 described above has solved several important engineering issues associated with and detrimental to the application of magnetostrictive actuator technology to new generation deformable mirrors, precision translation stages, or actively damped space structures. So, for instance, the thermal expansion associated with prior magnetostrictive actuator designs has been reduced to negligible proportions by removing the solenoid 17, which produces $I^2R$ heating, from the region of the active member 23. As a result, no additional actuator stroke is required any longer for thermal compensation. The actuator-to-actuator differential thermal expansion is greatly reduced, thus diminishing the residual effects and thermal sensitivity of the heat exchanger of the mirror arrangement 27. The otherwise existing need for providing an electronic driver feedback compensation for thermal growth control is eliminated.

Moreover, by removing the solenoid coil 17 from the active member region, active liquid cooling of individual actuator arrangements 10 is no longer required. Consequently, the complexity of the actuator cooling system is greatly reduced. All solenoids 17 and 17' are now simply contained in a common coolant manifold or plenum disposed remotely from the active member regions. As a result, both the heat exchanger of the mirror arrangement 27 and the magnetostrictive active members 23 are completely thermally isolated from the actuator coolant, and there is no need for using corrosion inhibitor additives to the actuator coolant. Also, as a result of the elimination of the heretofore required complex flow paths for the actuator solenoid cooling, the coolant flow induced jitter associated with individual active actuator cooling is eliminated as well. As a result of the simplified actuator coolant system, there is obtained a significant reduction in the mechanical complexity of the actuator arrangements 10 and 10'. So, for example, no precision machining is required for coolant or coil wire inlet/exit ports. It is no longer necessary to provide by electron discharge machining a hole through the center of the active member 23 for the passage of the coolant therethrough. The number of required actuator parts has been reduced to a minimum.

The modular, self-contained mechanical design of the actuator arrangements 10 and 10' maintains the concept of replaceability. In fact, replacement of the solenoid coil 17 or 17', which is the only electrical part of the actuator arrangement 10 or 10', is a simple procedure since all of the solenoid coils 17 and 17' are situated in a readily accessible common manifold. The region of the active member 23 may or may not be removed, depending on the application and need. As a matter of fact, since the active member 23 is a solid rod of the magnetostrictive material and since no electrical contacts or components are located at the active member region, permanent installation is recommended, especially when an array of many hundred or thousands of the actuators 10 and 10' is to be used, in view of the inherent stability of the material of the active members 23.

The packing density capability is also increased because the actuator diameter is no longer limited by the diameter of the solenoid coils 17 and 17' In other words, because of the axially staggered arrangement of the adjacent solenoid coils 17 and 17' in relation to one another, the spacing between the adjacent actuator arrangements 10 and 10' need be only slightly more than the diameter of the core 13 and a single, rather than double, radial dimension of the solenoid coil 17 or 17' or that of the end flanqes 15, 15', 16 and 16'. This results in the achievement of actuator spacings of less than 0.7 centimeter where 1 centimeter was the demonstrated lower limit in prior actuator designs.

The actuator reliability, stability and lifetime have been greatly improved when using the actuator arrangement construction of the present invention. The active member 23 is a single, solid component which is completely isolated from all cooling fluid. As already mentioned before, the number of components of the actuator arrangement has been reduced to a minimum, and no electrical parts are contained in the active member region. Material aging and creep are virtually nonexistent. The mechanical design is that of a self-contained modular unit which is completely replaceable and scalable. The actuator arrangement 10 or 10' is serviceable even subsequent to the initial installation. Especially, the solenoid coils 17 or 17' are easily accessible and replaceable, in most instances even without removal of the entire actuator arrangement 10 or 10'. No degradation of the optical or reflective surface 29 of the faceplate 28 is experienced during the solenoid coil replacement. In contradistinction thereto, it is possible that a re-polish of the reflective surface 29 would be required if the actuator arrangements 10 or 10' had to be removed in their entirety for the solenoid coil replacement.

Last but not least, the actuator arrangement design of the present invention is compatible with a multi-layer dielectric coating environment which entails exposure of the arrangement to temperatures around 170° C. for eight hour periods or more. The actuator arrangement 10 or 10' can also be thermally matched to the substrate material to eliminate differential thermal growth during the multi-layer dielectric coating application cycle. No outgassing materials or components are used in the actuator arrangement construction. A significant cost reduction has been achieved by the actuator arrangement construction of the present invention over that associated with conventional magnetostrictive actuator designs, due to mechanical and cooling simplicity. Precision machining and time-consuming assembly procedures are not required. The magnetodistortive actuator arrangement construction of the present invention offers scaling potential to deformable mirror assemblies utilizing an array of a thousand or more of the actuator arrangements 10 and 10', especially when employing the concept of permanent mounting of the active member region and replacement of only the solenoid coils 17 and 17'.

While the present invention has been illustrated an described as embodied in a particular construction of an actuator arrangement by itself and as used in a cooled flexible mirror assembly, it will be appreciated that the present invention is not limited to this particular example; rather, the scope of protection of the present invention is to be determined solely from the attached claims.

I claim:

1. A magnetodistortive actuator arrangement comprising
    an elongated core of a highly magnetically permeable material, centered on a longitudinally axis and having two axially spaced end portions;
    a solenoid coil surrounding one of said end portions of said core and operative when energized for generating an electromagnetic field which permeates said core and has a high intensity region extending beyond the other of said end portions of said core; and
    an active member of a magnetodistortive material separate from and connected to said core and extending axially beyond said other end portion thereof remotely from said coil at least partially through said high-intensity region of said electromagnetic field for the latter to change at least the axial dimension of said active member.

2. The actuator arrangement as defined in claim 1, and further comprising means for subjecting said active member to a mechanical bias in a sense of axially compressing said active member.

3. The actuator arrangement as defined in claim 1, wherein said active member has an end face remote from and facing away from said other end portion of said core; and further comprising a permanent magnet situated at said end face of said active member.

4. The actuator arrangement as defined in claim 3, wherein said permanent magnet generates a permanent magnetic field of an intensity sufficient to bias said active member into a substantially linear high-gain region of its field-strain response characteristic.

5. The actuator arrangement as defined in claim 3, and further comprising a pusher of a material having a low thermal expansion coefficient, said pusher forming an axial continuation of said permanent magnet that extends beyond said permanent magnet away from said active member to transmit the axial forces of said active member.

6. The actuator arrangement as defined in claim 5, wherein said thermal expansion coefficient of the material of said pusher is so matched to that of the magnetodistortive material of said active member that the thermal expansion of said pusher substantially compensates for the thermal expansion of said active member.

7. The actuator arrangement as defined in claim 1, wherein said magnetodistortive material of said active member is a magnetostrictive material.

8. A magnetodistortive actuator arrangement comprising
an elongated core of a highly magnetically permeable material, centered on a longitudinal axis and having two axially spaced end portions;
a solenoid coil surrounding one of said end portions of said core and operative when energized for generating an electromagnetic field which permeates said core and has a high intensity region extending beyond the other of said end portions of said core;
an active member of a magnetodistortive material connected to said core and extending axially beyond said other end portion thereof at least partially through said high-intensity region of said electromagnetic field for the latter to change at least the axial dimension of said active member; and
means for subjecting said active member to a mechanical bias in a sense of axially compressing said active member, including a bellows-type spring surrounding said active member and having a portion remote from said other end portion of said core, and means for transmitting forces between said portion of said spring and said active member.

9. The actuator arrangement as defined in claim 8, wherein said transmitting means includes an end plate connected to said portion of said spring and acting on said active member.

10. The actuator arrangement as defined in claim 9, wherein said active member has an end face remote from and facing away from said other end portion of said core; and wherein said transmitting means further includes a permanent magnet interposed between said end plate and said end face of said active member.

11. The actuator arrangement as defined in claim 10, wherein said permanent magnet generates a permanent magnetic field of an intensity sufficient to bias said active member into a substantially linear high-gain region of its field-strain response characteristic.

12. The actuator arrangement as defined in claim 8, and further comprising a pusher of a material having a low thermal expansion coefficient, said pusher forming an axial continuation of said transmitting means that extends beyond said spring away from said active member to transmit the axial forces of said active member.

13. The actuator arrangement as defined in claim 12, wherein said thermal expansion coefficient of the material of said pusher is so matched to that of the magnetodistortive material of said active member that the thermal expansion of said pusher substantially compensates for the thermal expansion of said active member.

14. A magnetodistortive actuator arrangement comprising
an elongated core of a highly magnetically permeable material, centered on a longitudinal axis and having two axially spaced end portions;
a solenoid coil surrounding one of said end portions of said core and operative when energized for generating an electromagnetic field which permeates said core and has a high intensity region extending beyond the other of said end portions of said core;
an active member of a magnetodistortive material connected to said core and extending axially beyond said other end portion thereof at least partially through said high-intensity region of said electromagnetic field for the latter to change at least the axial dimension of said active member; and
a pusher of a material having a low thermal expansion coefficient, said pusher forming an axial continuation of said active member that extends beyond an end face of said active member that is remote from said core to transmit the axial forces of said active member.

15. The actuator arrangement as defined in claim 14, wherein said thermal expansion coefficient of the material of said pusher is so matched to that of the magnetodistortive material of said active member that the thermal expansion of said pusher substantially compensates for the thermal expansion of said active member.

16. A magnetodistortive actuator arrangement for a flexible mirror that is mounted on a support, comprising:
an array of magnetodistortive actuators each including
an elongated core of a highly magnetically permeable material stationarily mounted on the support, centered on a longitudinal axis and having two axially spaced end portions,
a solenoid coil surrounding one of said end portions of said core and operative when energized for generating an electromagnetic field which permeates said core and has a high intensity region extending beyond the other of said end portions of said core,
an active member of a magnetodistortive material separate from and connected to said core and extending axially beyond said other end portion thereof remotely from said coil at least partially through said high-intensity region of said electromagnetic field for the latter to cause a change at least the axial dimension of said active member, and
means for applying said change to the flexible mirror.

17. The actuator arrangement as defined in claim 16, wherein said magnetodistortive material of said active member is a magnetostrictive material.

18. A magnetodistortive actuator arrangement for a flexible mirror that is mounted on a support, comprising:
an array of magnetodistortive actuators each including
an elongated core of a highly magnetically permeable material stationarily mounted on the support, centered on a longitudinal axis and having two axially spaced end portions,
a solenoid coil surrounding one of said end portions of said core and operative when energized for generating an electromagnetic field which permeates said core and has a high intensity region extending beyond the other of said end portions of said core, said coils of adjacent ones of said actuators being staggered relative to one another in the axial direction of said cores to such an extent as not to overlap one another,
an active member of a magnetodistortive material connected to said core and extending axially beyond said other end portion thereof at least partially through said high-intensity region of said electromagnetic field for the latter to cause a change at least the axial dimension of said active member, and
means for applying said change to the flexible mirror.

19. A magnetodistortive actuator arrangement for a flexible mirror that is mounted on a support, comprising:
an array of magnetodistortive actuators each including an elongated core of a highly magnetically permeable material stationarily mounted on the support, centered on a longitudinal axis and having two axially spaced end portions, a solenoid coil surrounding one of said end portions of said core and operative when energized for generating an electromagnetic field which permeates said core and has a high intensity region extending beyond the other of said end portions of said core, an active member of a magnetodistortive material connected to said core and extending axially beyond said other end portion thereof at least partially through said high-intensity region of said electromagnetic field for the latter to cause a change at least the axial dimension of said active member; and means for applying said change to the flexible mirror, including a pusher of a material having a low thermal expansion coefficient, said pusher forming an axial continuation of said active member that extends beyond an end face of said active member that is remote from said core to transmit the axial forces of said active member to the mirror.

20. The actuator arrangement as defined in claim 19, wherein said thermal expansion coefficient of the material of said pusher is so matched to that of the magnetodistortive material of said active member that the thermal expansion of said pusher substantially compensates for the thermal expansion of said active member.

* * * * *

UNITED STATES PATENT AND TRADEMARK OFFICE
CERTIFICATE OF CORRECTION

PATENT NO. : 4,861,149

DATED : August 29, 1989

INVENTOR(S) : Mark A. Ealey

It is certified that error appears in the above-identified patent and that said Letters Patent is hereby corrected as shown below:

Column 7, Line 18  "ULE Glass TM" should be --ULE GLASS TM--

Column 7, Line 54  "Cruma (®)" should be --CRUMAX ®--

Signed and Sealed this

Tenth Day of March, 1992

Attest:

HARRY F. MANBECK, JR.

Attesting Officer     Commissioner of Patents and Trademarks